J. R. GAMMETER.
DRIVING MECHANISM.
APPLICATION FILED OCT. 30, 1912.

1,076,632.

Patented Oct. 21, 1913.

Witnesses:

John R. Gammeter, Inventor
By his Attorney
Seward Davis

UNITED STATES PATENT OFFICE.

JOHN R. GAMMETER, OF AKRON, OHIO.

DRIVING MECHANISM.

1,076,632. Specification of Letters Patent. Patented Oct. 21, 1913.

Original application filed August 22, 1912, Serial No. 716,388. Divided and this application filed October 30, 1912. Serial No. 728,532.

*To all whom it may concern:*

Be it known that I, JOHN R. GAMMETER, a citizen of the United States, residing in the city of Akron, county of Summit, and State of Ohio, have invented certain new and useful Improvements in Driving Mechanism, of which the following is a specification.

My invention relates to means for propelling dirigible aerostats or the like and particularly to improvements in that form of driving system which employs two or more separate motors or sources of power acting through a common driving mechanism to propel the device.

Many accidents have resulted from the derangement of the driving mechanism of aeroplanes and particularly from the failure of the prime mover. In order to minimize this hazard, it has heretofore been suggested that a plurality of motors be used, so that in the event of the failure of one, sufficient power will still be available to give headway to the machine and permit the operator to make a landing in safety.

My invention is directed essentially to the driving connection between the motors which permits power to be supplied to the propelling means from both motors simultaneously or from either motor when the other becomes dead from any cause.

This case is a division of my application for United States Letters Patent, Serial No. 716,388, filed August 22, 1912.

Figure 1:
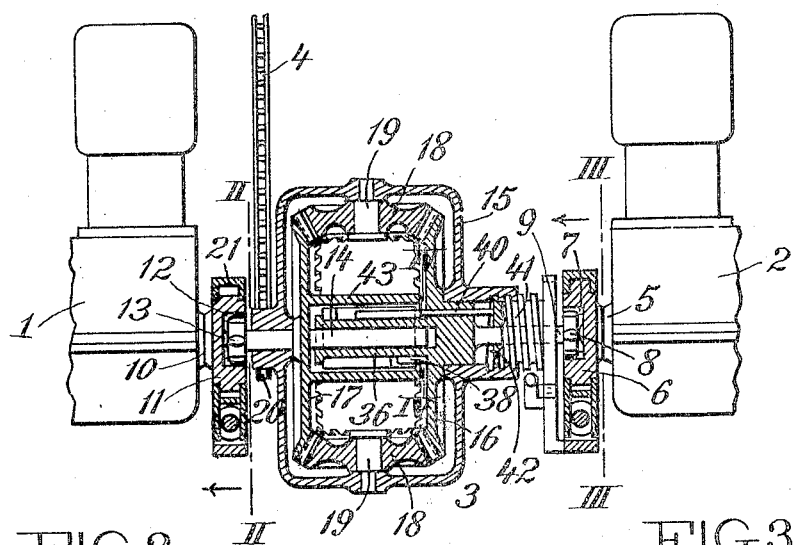
Figure 2:
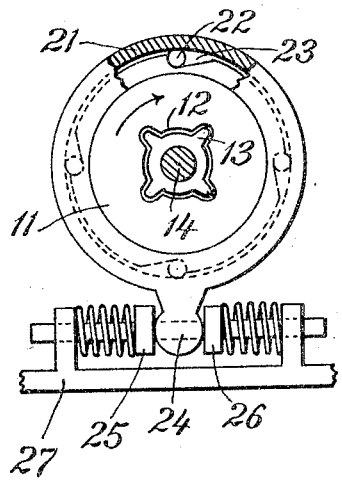
Figure 4:
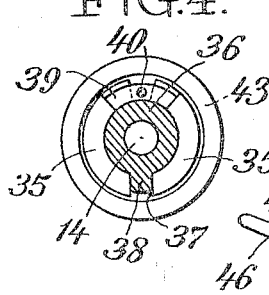
Figure 3:
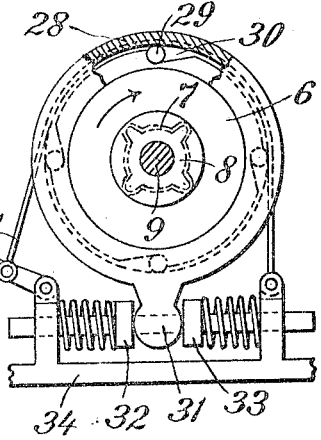
Figure 5:
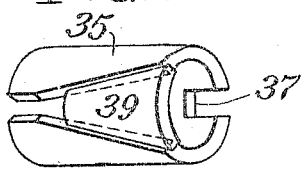

In the accompanying drawings which form a part of this specification, Figure 1 is a transverse sectional view of a device whereby a plurality of motors having their driving shafts in line may be connected to the driving gear; Fig. 2 is a transverse sectional view on line II—II of Fig. 1; Fig. 3 is a transverse sectional view on line III—III of Fig. 1; Fig. 4 is a transverse sectional view on line IV—IV of Fig. 1; and Fig. 5 is a perspective view of an improved clutch member forming a part of the mechanism of Fig. 1.

Referring to the drawings in detail, the numerals 1 and 2, respectively, designate a pair of motors which act through a differential 3 and chain 4 to drive propeller means not shown. The mechanism for coupling the two motors so that they may be readily started, and further designed so that if one stops for any reason, the other will continue to drive the propeller at or near its normal rate of speed, is an improvement upon the device described and claimed in my co-pending application in the United States Patent Office, Serial Number 667,265, filed December 22, 1911. The motor 2 is provided with a shaft 5 which is secured to a disk 6, the face of which is recessed at 7 to receive a clutch member 8 secured to a shaft 9, yieldable driving connection thereby being established between the motor 2 and the shaft 9. The motor 1 is provided with a driving shaft 10 carrying the disk 11, which is similarly recessed at 12 to receive a clutch member 13 carried by the shaft 14. The shafts 9 and 14, which are substantially in line, pass through the casing 15 of the differential and carry upon their respective extremities the differential gears 16 and 17, which mesh with a second set of differential gears 18 mounted upon the stud shafts 19 carried by the differential case. At one side the differential case is provided with a driving sprocket 20, over which runs the main driving chain 4. The disk 11 is provided with a roller or ball clutch comprising the annular ring 21 and balls or rollers 22 entering the race 23. The ring 21 is provided at its lower extremity with a lug 24 capable of slight oscillation between the spring bumpers 25 and 26 secured to any suitable fixed part 27 of the mechanism. The disk 6 is connected to a similar ball or roller clutch homologously arranged, comprising the annular ring 28, balls or rollers 29, and the race 30, the ring 28 having a depending lug 31 received between the spring bumpers 32 and 33 mounted upon any suitable fixed part, 34, of the mechanism.

It will be apparent that when the two motors are operated in the direction of the arrows in Figs. 2 and 3, the clutches will have no effect whatever upon their operation. Should one of the motors stop, however, the tendency of the differential, for reasons which are well-known and need not be set forth in detail here, will be to cause the motor in operation to drive the dead motor in a direction opposite to that in which the dead motor normally rotates. When this state of affairs occurs the clutch associated with the dead motor will prevent its backward or reverse rotation, that is, rotation contrary to the direction of the arrows in Figs. 2 and 3, and the live motor will continue to drive the propeller mechanism through the differential at a speed which is somewhat less than its normal speed. Were it not for the interposition of clutches between each motor and the differential, the live motor would tend to drive the dead motor backward and the greater part of its power would thus be uselessly expended.

In order to facilitate starting the motors, I provide a clutch for locking the gears of the differential as a unit, comprising a split ring 35 mounted upon a sleeve 36 carried by the shaft 9. The ring is slotted at 37 to receive a key 38 mounted on the sleeve and has a tapered segment 39 cut therefrom, the movement of which is controlled by a rod 40, the end of which is forced by the spring of the ring to abut against an externally threaded nut 41 which engages the internal threads 42 in the casing of the differential. A hollow cylindrical boss 43 is formed integral with the gear 17 and surrounds the ring 35. A slight annular space normally separates the boss from the ring. When the nut 41 is screwed up on its threads, the segment 39 will be wedged into the split ring 35, causing an expansion of the ring against the member 43 and thereby locking the shaft 9 to the member 43. The differential is thereby prevented from operating in its normal manner and becomes in effect a solid unit. If the differential is thus locked, an operation which may easily be accomplished by hand, and an attempt is made to crank the motors by the usual method of whirling the propeller, the effect will be to rotate the shafts of both motors in the proper direction for starting. As soon as the motors have picked up speed a simple pressure on the arm 46 connected to the brake band 47 passing over the head of the nut 41 will cause the latter to back away from the casing toward the motor 2, thus releasing direct connection between the shafts 9 and 10. The two motors will then operate through the differential in their normal manner.

While I have illustrated and described only one specific embodiment of my invention, I realize that it is susceptible of wide variation and that the principle thereof may be embodied in many different structures. I therefore do not intend to limit myself to the details of structure shown and described, but desire to cover my invention broadly.

Having thus described my invention, I claim:

1. In a power unit for aerostats, a pair of motors adapted to rotate in the same direction, a differential gearing interposed between the driving shafts of said motors, means for preventing the backward rotation of either of said motors, and means for locking together the shafts of the motors to cause the same to rotate in unison comprising a sleeve on one of said shafts surrounding an extension of the other, and a clutch member interposed in the annular space between said sleeve and extension.

2. In a power unit for aerostats, a pair of motors adapted to rotate in the same direction, a differential gearing interposed between the driving shafts of said motors, means for preventing the backward rotation of either of said motors, means for locking together the shafts of the motors to cause the same to rotate in unison comprising a sleeve on one of said shafts surrounding an extension of the other, a split ring interposed in the annular space between said sleeve and extension, means for positively driving the same from the second shaft, and means for causing the ring to expand against the sleeve and grip the same.

3. In a power unit for aerostats, a pair of motors adapted to rotate in the same direction, a differential gearing and a casing therefor interposed between the driving shafts of said motors, power transmission means carried by the said casing, means for preventing the backward rotation of either of said motors, means for locking together the shafts of the motors to cause the same to rotate in unison comprising a sleeve on one of said shafts surrounding an extension of the other, a split ring interposed in the annular space between said sleeve and extension, means for keying the ring to the extension, and means for expanding the ring against the sleeve including a wedge-shaped segment interposed between the adjacent edges of the ring at the split therein.

4. In a power unit for aerostats, a pair of motors adapted to rotate in the same direction, a beveled gear driven by each of said motors, a differential gearing and a casing therefor interposed between the driving shafts of said motors, power-transmission means carried by said casing, means for preventing the backward rotation of either of said motors, a clutch for locking together the shafts of the motors to cause the same to rotate in unison, unclutching means including a nut engaging a threaded portion of the differential gearing, and means for causing said nut to move with relation thereto including a brake band secured to a fixed part of the device and means for tightening the same over a part of the nut.

5. In a power unit for aerostats, a pair of driving shafts adapted to rotate in the same direction, a differential gearing and a casing therefor interposed between said shafts, power-transmission means carried by said casing, a clutch for locking together the shafts to cause them to rotate in unison, and unclutching means including a threaded member driven in unison with one of said shafts, a nut mounted on said threaded member and adapted to control said clutch, and means for causing said nut to move with relation to said threaded member including braking means secured to a fixed part of the device, and means for bringing the same into frictional engagement with said nut.

6. In a power unit for aerostats, a pair of driving shafts, a differential gearing and a casing therefor interposed between said shafts, power-transmission means carried by said casing, a clutch for locking together the shafts to cause them to rotate in unison, and unclutching means including a threaded member driven in unison with one of said shafts, a nut mounted on said threaded member and adapted to control said clutch, and means for causing said nut to move with relation to said threaded member including a brake band secured to a fixed part of the device, and means for constructing the same over a part of the nut.

7. In a power unit for aerostats, a pair of driving shafts adapted to rotate in the same direction, a differential gearing and a casing therefor interposed between said shafts, power-transmission means carried by said casing, means for preventing the backward rotation of either of said shafts, and yieldable driving connection between said shafts and said differential.

8. In a power unit for aerostats, a pair of driving shafts adapted to rotate in the same direction, a differential gearing and a casing therefor interposed between said shafts, transmission means carried by said gearing, means for preventing the backward rotation of either of said shafts, a yieldable driving connection between said shafts and said gearing, and means for locking together the shafts to cause the same to rotate in unison.

9. In a power unit for aerostats, a pair of driving shafts adapted to rotate in the same direction, a differential gearing and a casing therefor interposed between said shafts, power-transmission means carried by said casing, means for preventing the backward rotation of either of said shafts, and means for locking together the shafts to cause the same to rotate in unison including a sleeve on one of them surrounding an extension of the other, and a clutch member interposed in the annular space between said sleeve and extension.

10. In a power unit for aerostats, a pair of motors, a yieldable driving connection between each motor and its shaft, means permitting the forward rotation of either or both and preventing the reverse rotation of either motor, a differential gearing and a casing therefor between such shafts, and clutching mechanism between such shafts within the said gearing, and means carried by said casing for transmitting power from both motors and either of them.

11. In a power unit for aerostats, a pair of motors adapted to rotate in the same direction, a differential gearing and its casing interposed between the driving shafts of said motors, power transmission means carried by said casing, means for preventing the backward rotation of either of said motors, and means for locking together the shafts of the motors to cause the same to rotate in unison comprising a sleeve on one of said shafts surrounding an extension of the other, and a clutch member comprising a split ring interposed in the annular space between said sleeve and extension, and means for causing the ring to expand against the sleeve and grip the same, including a wedge-shaped segment interposed between the adjacent edges of the ring at the split therein.

12. In a power unit for aerostats, a pair of motors adapted to rotate in the same direction, a differential gearing and its casing interposed between the driving shafts of said motors, power transmission means carried by said casing, means for preventing the backward rotation of either of said motors, and means for locking together the shafts of the motors to cause the same to rotate in unison comprising a sleeve on one of said shafts surrounding an extension of the other, and a clutch member comprising a split ring interposed in the annular space between said sleeve and extension, and means for causing the ring to expand against the sleeve and grip the same, including a wedge-shaped segment interposed between the adjacent edges of the ring at the split therein, and unclutching means including a nut adapted to engage a threaded portion of the differential, and means for causing said nut to move relatively thereto.

JOHN R. GAMMETER.

Witnesses:
 WM. C. LAWSON,
 WM. P. HILL.